US012392889B2

United States Patent
D'Errico et al.

(10) Patent No.: US 12,392,889 B2
(45) Date of Patent: Aug. 19, 2025

(54) TARGET DETECTION METHOD FOR GROUND-PENETRATING RADAR AND ASSOCIATED RADAR

(71) Applicant: COMMISSARIAT A L'ENERGIE ATOMIQUE ET AUX ENERGIES ALTERNATIVES, Paris (FR)

(72) Inventors: Raffaele D'Errico, Grenoble (FR); Jean-Baptiste Dore, Grenoble (FR); Gloria Makhoul, Grenoble (FR); Luc Maret, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 378 days.

(21) Appl. No.: 18/012,965

(22) PCT Filed: Jun. 22, 2021

(86) PCT No.: PCT/EP2021/067038
§ 371 (c)(1),
(2) Date: Dec. 26, 2022

(87) PCT Pub. No.: WO2022/002700
PCT Pub. Date: Jan. 6, 2022

(65) Prior Publication Data
US 2023/0266461 A1    Aug. 24, 2023

(30) Foreign Application Priority Data
Jun. 30, 2020  (FR) ........................... 2006870

(51) Int. Cl.
*G01S 13/88*    (2006.01)
*G01S 7/41*     (2006.01)

(52) U.S. Cl.
CPC ............. *G01S 13/885* (2013.01); *G01S 7/411* (2013.01)

(58) Field of Classification Search
None
See application file for complete search history.

(56) References Cited

U.S. PATENT DOCUMENTS 4,783,753 A * 11/1988 Crimmins ................. G06T 5/20
                                                      342/25 A
4,839,654 A *  6/1989 Ito ............................ G01V 3/12
                                                      342/25 A (Continued)

OTHER PUBLICATIONS

Ho, et al., "A linear prediction land mine detection algorithm for hand held ground penetrating radar", IEEE Transactions on Geoscience and Remote Sensing, vol. 40, Issue 6, pp. 1374-1384, 2002.

(Continued)

*Primary Examiner* — Peter M Bythrow
(74) *Attorney, Agent, or Firm* — BakerHostetler

(57) ABSTRACT

A method for detecting at least one target buried in an area of the ground, using a ground-penetrating radar, the method includes the steps of: acquiring a measurement of a signal transmitted by each transmitting antenna and reflected in the area of the ground, converting an estimate, into the frequency domain, of the propagation channel for each pair consisting of a transmitting antenna and of a receiving antenna, defining a first hypothesis H0 corresponding to an absence of target in the area of the ground, defining a second hypothesis H1 corresponding to the presence of at least one target in the area of the ground, performing a test of the likelihood ratio between the likelihood of the channel matrix under the second hypothesis H1 and the likelihood of the channel matrix under the first hypothesis H0, in order to conclude whether a target is present at a given position in the area of the ground.

14 Claims, 4 Drawing Sheets

(56) References Cited

U.S. PATENT DOCUMENTS

| | | | | |
|---|---|---|---|---|
| 5,327,139 | A * | 7/1994 | Johnson | G01S 13/0209 342/22 |
| 5,977,905 | A * | 11/1999 | Le Chevalier | G01S 13/53 342/136 |
| 6,466,155 | B2 * | 10/2002 | Taylor | G01S 7/292 342/28 |
| 6,700,526 | B2 * | 3/2004 | Witten | G01S 7/28 342/195 |
| 7,173,560 | B2 * | 2/2007 | Li | F41H 11/12 324/326 |
| 7,511,654 | B1 * | 3/2009 | Goldman | G01V 3/15 342/179 |
| 7,834,801 | B2 * | 11/2010 | Waite | G01V 11/00 342/22 |
| 8,618,976 | B2 * | 12/2013 | Paglieroni | G01S 13/003 342/191 |
| 10,175,350 | B1 * | 1/2019 | Tsokos | G01V 3/12 |
| 2006/0087471 | A1 * | 4/2006 | Hintz | F41H 11/136 342/90 |
| 2012/0206293 | A1 * | 8/2012 | Nguyen | G01S 13/9089 342/179 |
| 2013/0082862 | A1 * | 4/2013 | Paglieroni | G01S 13/885 342/91 |
| 2014/0191899 | A1 * | 7/2014 | Pickle | G01S 13/888 342/175 |
| 2014/0240162 | A1 * | 8/2014 | Debroux | G01S 13/885 342/22 |
| 2015/0268218 | A1 * | 9/2015 | Troxler | G01N 9/24 342/21 |

OTHER PUBLICATIONS

Ho, et al., "An Investigation of Using the Spectral Characteristics From Ground Penetrating Radar for Landmine/Clutter Discrimination", IEEE Transactions on Geoscience and Remote Sensing, vol. 46, Issue 4, pp. 1177-1191, Apr. 2008.

Pambudi, et al., "Minimax Robust Landmine Detection Using Forward-Looking Ground-Penetrating Radar", IEEE Transactions on Geoscience and Remote Sensing, vol. 58, Issue 7, pp. 5032-5041, Jul. 2020.

Hoarau, et al., "Robust adaptive detection of buried pipes using GPR", Signal Processing, vol. 132, pp. 293-305, Mar. 2017.

Ambrosanio, et al., "The tomographic approach to ground-penetrating radar for underground exploration and monitoring", IEEE Signal Processing Magazine, vol. 36, Issue 4, pp. 62-73, 2019.

Chong, "Signal processing for MIMO radars : detection under gaussian and non-gaussian environments and application to STAP", Thesis, 2011.

Hogbom, "Aperture Synthesis with a Non-Regular Distribution of Interferometer Baselines", Astronomy and Astrophysics Supplement, vol. 15, pp. 417-426, Jun. 1974.

Marpaung, et al., "A comparative study of migration algorithms for Uwb Gpr images in SISO-SAR and MIMO-array configurations", 2014 15th International Radar Symposium (IRS), pp. 1-4, 2014.

Zeng, et al., "Improvement of target imaging quality by multi-polarization MIMO GPR", 2012 14th International Conference on Ground Penetrating Radar (GPR), pp. 119-124, 2012.

Zhuge, et al., "Three-dimensional near-field mimo array imaging using range migration techniques", IEEE Transactions on Image Processing, vol. 21, No. 6, pp. 3026-3033, 2012.

Byrd, et al., "A Trust Region Method Based on Interior Point Techniques for Nonlinear Programming." Mathematical Programming, vol. 89, No. 1, 2000, pp. 149-185.

Byrd, et al., "An Interior Point Algorithm for Large-Scale Nonlinear Programming", SIAM Journal on Optimization, vol. 9, No. 4, pp. 877-900, 1999.

Coleman, et al., "An Interior, Trust Region Approach for Nonlinear Minimization Subject to Bounds", SIAM Journal on Optimization, vol. 6, pp. 418-445, 1996.

* cited by examiner

TARGET DETECTION METHOD FOR GROUND-PENETRATING RADAR AND ASSOCIATED RADAR

CROSS-REFERENCE TO RELATED APPLICATIONS

This application is a National Stage of International patent application PCT/EP2021/067038, filed on Jun. 22, 2021, which claims priority to foreign French patent application No. FR 2006870, filed on Jun. 30, 2020, the disclosures of which are incorporated by reference in their entirety.

FIELD OF THE INVENTION

The invention relates to the field of ground-penetrating radars or georadars which cover all of the techniques making it possible to detect, locate or identify underground targets by means of a radio-frequency system.

BACKGROUND

Underground targets are, for example, pipes of different diameters and types (steel, PVC, cement, concrete, etc.) which may be buried at various depths.

One objective of ground-penetrating radars is to locate such objects with precision in order to be able to correctly map a subsurface, for example for safety needs during works.

A general problem targeted by the invention relates to locating underground targets with precision whatever dielectric media the radar signals pass through.

A first type of location method which is compatible with ground-penetrating radars relates to so-called migration techniques derived from imagery. These methods are based on solving the wave equation by interpolating in the frequency domain.

Document [1] describes a radar imaging method for systems with a transmitting antenna and a receiving antenna (of the SISO ("Single-Input Single-Output") type). Documents [4] and [6] give examples of radar imaging methods applied to systems having several transmitting and receiving antennas, that is to say antenna arrays (of the MIMO ("Multiple-Input Multiple-Output") type).

One drawback of imaging or migration methods is that they generally utilize only the phase information of the signals captured. The amplitude information is not used either to determine the position of a target or to estimate the signal transmission losses in the medium passed through. In addition, the objective of these methods is to construct an image of an area and they require post-processing to determine the position of a target.

Document [5] describes another method based on an antenna array for virtually creating a plane wave. This solution also has the drawback of requiring transmission pre-processing.

Document [2] describes a radar technique of the MIMO type which utilizes the amplitude of the signals captured but does not consider the influence of the transmission losses during the propagation of the signals in the ground. The effect of this simplification is to limit the location precision, notably in the case of heterogeneous media and of areas comprising several close targets to be detected.

SUMMARY OF THE INVENTION

The present invention aims to remedy the drawbacks of the aforementioned state-of-the-art techniques by proposing a location method which takes into account the dielectric losses in the ground in order to improve the precision in detecting and locating the targets.

One subject of the invention is a method for detecting at least one target buried in an area of the ground, using a ground-penetrating radar, the radar comprising at least one transmitting antenna and at least one receiving antenna, the method comprising the steps of:

acquiring, on each receiving antenna, a measurement of a signal transmitted by each transmitting antenna and reflected in the area of the ground, determining, on the basis of said measurements, an estimate, in the frequency domain, of the propagation channel for each pair consisting of a transmitting antenna and of a receiving antenna, said estimates being grouped together in a channel matrix having a first dimension which is equal to the number of receiving antennas, a second dimension which is equal to the number of transmitting antennas and a third dimension which is equal to the number of frequencies, defining a first hypothesis H0 corresponding to an absence of target in the area of the ground, the channel matrix under this first hypothesis being modeled by noise, defining a second hypothesis H1 corresponding to the presence of at least one target in the area of the ground, the channel matrix under this second hypothesis being modeled by a propagation channel model depending at least on the characteristics of the transmitting antennas and of the receiving antennas and on the signal propagation losses in the ground, performing a test of the likelihood ratio between the likelihood of the channel matrix under the second hypothesis H1 and the likelihood of the channel matrix under the first hypothesis H0, in order to conclude whether a target is present at a given position in the area of the ground.

According to one particular aspect of the invention, the step of performing a test of the likelihood ratio between the first hypothesis H0 and the second hypothesis H1 comprises the sub-steps of:

determining at least one estimator of the maximum likelihood of the position and of the radar cross section of a target, under the second hypothesis H1, determining the likelihood of the channel matrix under the second hypothesis H1 for each estimator, determining the likelihood of the channel matrix under the first hypothesis H0, comparing the ratio between the two likelihoods with a predetermined detection threshold in order to deduce therefrom the presence or the absence of a target for each estimated position.

According to one particular aspect of the invention, the step of determining at least one estimator of the maximum likelihood of the position and of the radar cross section of a target, under the second hypothesis H1, is performed by searching for at least one extremum of a function of three variables depending on the position of a target in the area of the ground, on the radar cross section of a target and on a coefficient of signal transmission losses in the area of the ground.

According to one particular aspect of the invention, the search for at least one extremum of said function of three variables is performed by:

determining an estimator of the maximum likelihood of the radar cross section by calculating a normalized correlation between the channel matrix and a loss matrix including the transfer functions of the transmitting and receiving antennas, the signal propagation losses in free space and in the area of the ground, searching for at least one extremum according to the position and the loss coefficient of said function evaluated for the estimated radar cross section.

According to one particular aspect of the invention, the likelihood of the channel matrix under the second hypothesis H1 is determined by an extremum of said function.

According to one particular aspect of the invention, the likelihood of the channel matrix under the first hypothesis H0 is determined at least by calculating the energy of the channel matrix.

According to one particular aspect of the invention, a target position is searched for in a two- or three-dimensional grid having a defined initial pitch, the method being iterated over several iterations, reducing the area and the initial pitch in each iteration.

In one variant embodiment, the method according to the invention comprises the steps of:
converting the propagation channel estimates for each pair consisting of a transmitting antenna and of a receiving antenna, into the time domain,
applying a filter to the estimates in the form of time windowing,
converting the filtered estimates into the frequency domain,
grouping together the filtered estimates in a channel matrix.

According to one particular aspect of the invention, the time windowing is defined so as to filter the contributions of the signals corresponding to a distance interval between the radar and the area of the ground.

According to one particular aspect of the invention, the method is repeated for several different filters so as to cover the entire area of the ground.

In one variant embodiment, the method according to the invention further comprises a step of canceling the contribution of a target detected in the measurements of acquired signals, for example by means of an echo cancellation algorithm, the method being iterated over several successive iterations, canceling in each new iteration the echo of the target detected in the previous iteration.

Another subject of the invention is a ground-penetrating radar comprising at least one transmitting antenna and at least one receiving antenna and a device for detecting at least one target buried in an area of the ground configured to execute the steps of the detection method according to the invention.

Another subject of the invention is a computer program comprising instructions for executing the method according to the invention, when the program is executed by a processor, as well as a processor-readable storage medium on which a program is stored comprising instructions for executing the method according to the invention, when the program is executed by a processor.

BRIEF DESCRIPTION OF THE DRAWINGS

Other features and advantages of the present invention will become more apparent on reading the description which follows in relation to the following appended drawings.

DETAILED DESCRIPTION

Figure 1:
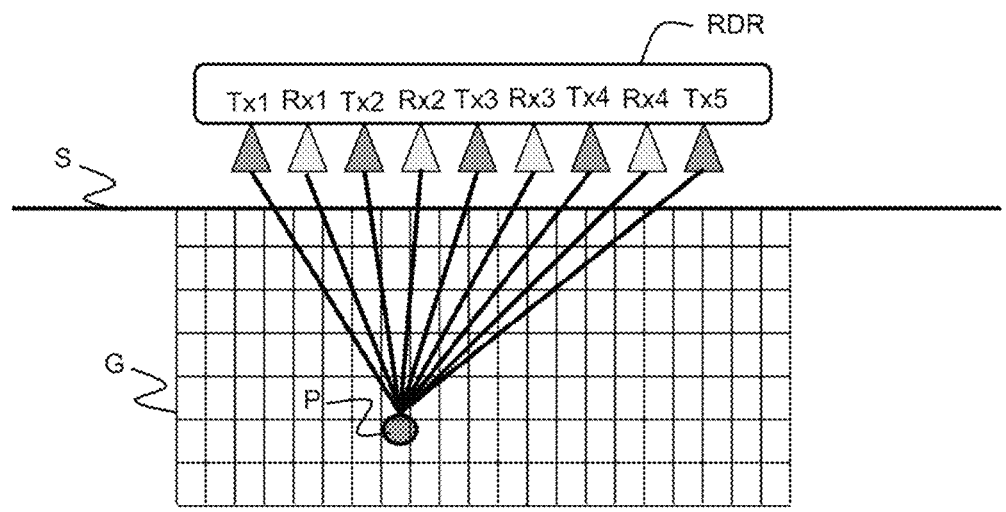
FIG. 1 shows an illustrative diagram of the operation of a ground-penetrating radar.

FIG. 1 shows a simplified diagram of the operating principle of a ground-penetrating radar RDR. Such a radar comprises one or more transmitting antennas and one or more receiving antennas. In the example of FIG. 1, the radar comprises five transmitting antennas and four receiving antennas. Without departing from the scope of the invention, the number of transmitting and receiving antennas may take any non-zero integer value.

An area of the ground broken down into a grid G is analyzed by the georadar RDR by carrying out a sequence of signal acquisitions and transmissions for each pair consisting of a transmitting antenna and of a receiving antenna. For example, an acquisition sequence consists in transmitting a radar signal from the first transmitting antenna Tx1, this signal is reflected on a possible target P located in the area G then back-propagated towards each receiving antenna Rx1, Rx2, Rx3, Rx4. This sequence is repeated for each transmitting antenna Tx2, Tx3, Tx4, Tx5.

The target search area may be a two- or three-dimensional area.

The radar may be mobile, for example on board a vehicle, in order to cover various areas of the ground.

The invention is implemented by a radar of the type in FIG. 1.

Figure 2:
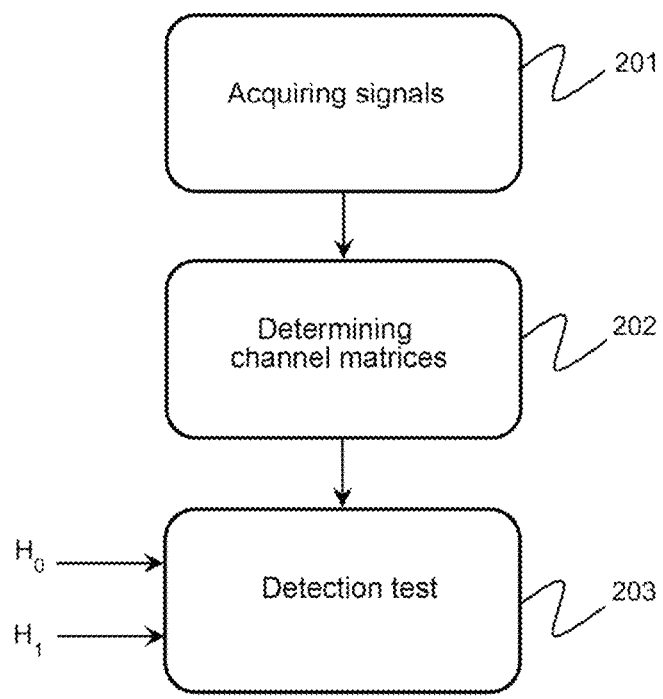
FIG. 2 shows a general flowchart describing the steps of a target detection method according to one embodiment of the invention.

FIG. 2 illustrates the main steps of the target detection method according to the invention.

The first step 201 consists in acquiring the signals during a transmitting-receiving sequence as described above.

The acquisition sequence performs a frequency sweep according to a predefined set of frequencies. In other words, the transmitting-receiving sequences on all of the antennas are repeated for several frequencies defining a frequency band to be analyzed.

The acquisition sequence may follow the transmission as described above but may also be performed by simultaneously transmitting several orthogonal signals on all the transmitting antennas so as to simultaneously directly acquire the various echoes of each transmitting antenna for a given frequency.

In addition, successive frequency sweeps may be replaced by using a waveform of the OFDM (Orthogonal Frequency-Division Multiplexing) type which makes it possible to encode, in transmission, the signals by distribution on orthogonal frequency channels in the form of multiple subcarriers. The width of the channels or sub-bands and their spacing may be parameterized. These parameters may vary for each sub-band according to the signal-to-noise ratio which is specific to this sub-band.

On the basis of the signals received, a channel matrix estimation step 202 is performed. Signal acquisition is triggered at the same time as transmission. After acquisition, the signals are transposed to baseband, then demodulated via OFDM demodulation.

After OFDM demodulation, channel estimation is performed on each subcarrier, for example by correlating the symbols received with the known symbols transmitted on this subcarrier.

Channel estimation is performed over several OFDM symbols by coherently averaging the result in order to reduce the impact of thermal noise or interference.

Channel estimation is performed for each propagation channel defined by a link between a transmitting antenna Txi and a receiving antenna Rxj, but also for each frequency sub-band.

The complete frequency response is obtained by concatenating the responses of each sub-band.

Thus, at the end of the step 202, a set of channel matrices $H_r(f)$ is obtained, for several frequencies, each matrix having a dimension which is equal to the number of receiving antennas by the number of transmitting antennas.

The expression of the channel matrix estimated in reception may be written as a function of frequency by means of the following relationship:

$$H_r(f) = \sum_{k=0}^{K-1} H(f, p_k) + n(f) \tag{1}$$

$H(f,p_k)$ is the noise-free channel matrix for the frequency $f$ and a target located at position $p_k = \{x_k, y_k, z_k\}$. K is the number of targets for which an echo is received. $n(f)$ denotes the noise matrix for the frequency $f$.

The invention is notably based on a particular modeling of the channel matrix as detailed below, which takes into account the dielectric losses in the medium of which the ground consists.

The noise-free channel matrix $H(f,p_k)$ may be expressed using the following relationship, where $\odot$ is the term-by-term multiplication operator between two matrices.

$$H(f,p_k) = A(f,p_k,L) \odot U(f,p_k,L) \tag{2}$$

$U(f, p_k, L)$ is the matrix of the propagation delays the elements $(i,j)$ of which are expressed using the following relationship:

$$U[i,j](f, p_k, L) = e^{\sqrt{-1} \cdot 2\pi \frac{f}{v\sqrt{2}} d(p_k^{i,j}) \sqrt{\sqrt{1+L^2}+1}} \tag{3}$$

$\sqrt{-1}$ denotes the imaginary unit.

$v$ is the propagation speed of the wave in the medium through which the wave which is assumed to be homogeneous passes. According to the positioning of the radar, the medium passed through consists partly of air and of the layers of the ground, or only of the layers of the ground if the transmitting antennas are positioned directly against the surface of the ground.

$d(p_k^{i,j})$ is the sum of the respective distances between the transmitting antenna of index i and the target in position $p_k$, on the one hand, and this target and the receiving antenna of index j, on the other hand.

L is a loss coefficient which depends on the medium through which the wave passes. According to the medium (earth, sand, rock) which the ground consists of, the transmitted wave undergoes more or less significant attenuations which should be taken into account in order to model the channel matrix correctly.

The matrix $A(f, p_k, L)$ represents the matrix of the amplitudes of the echoes reflected on the target. This matrix incorporates the losses in the medium, the antenna gains and the radar cross section of the target.

This matrix is expressed using the following relationship:

$$A(f,p_k,L) = \gamma(f,p_k) \odot G_t(f,p_k) \odot G_r(f,p_k) \odot B_0(f,p_k) \odot B_1(f,p_k,L) \tag{4}$$

$\gamma(f, p_k)$ models the radar cross section of the target at the position $p_k$.

$G_t(f, p_k)$ models the transmitting antenna pattern in the direction of the position of the target.

$G_r(f, p_k)$ models the receiving antenna pattern in the direction of the position of the target.

The two matrices $G_t(f, p_k)$ and $G_r(f, p_k)$ are known and are determined on the basis of the characteristics of the antennas.

$B_0(f, p_k)$ and $B_1(f, p_k, L)$ are two matrices which together model the propagation losses of spherical waves in the ground.

$$B_0[i,j](f, p_k) = \frac{v}{4\pi\sqrt{4\pi} \, f d_\Pi(p_k^{i,j})} \tag{5}$$

$d_\pi(p_k^{i,j})$ is the product of the respective distances between the transmitting antenna of index i and the target in position $p_k$, on the one hand, and this target and the receiving antenna of index j, on the other hand.

$$B_1[i,j](f, p_k, L) = e^{2\pi \frac{f}{v\sqrt{2}} d(p_k^{i,j}) \sqrt{\sqrt{1+L^2}-1}} \tag{6}$$

The invention differs notably from the methods of the prior art by taking into account the loss coefficient L in the medium of the ground.

One objective of the method for detection by radar processing, according to the invention, is to determine the position of a target, having knowledge of the frequency response of the monitored zone.

Thus, the third step 203 of the method according to the invention consists in performing a target detection test on the basis of the modeling of the propagation channel introduced above, of the channel matrices determined in the step 202 and by considering a detection problem with two hypotheses $H_0$ and $H_1$. $H_0$ corresponds to a target absence hypothesis and $H_1$ corresponds to a target presence hypothesis.

The channel matrix may be expressed under the two hypotheses using the following relationships:

$$H_0: H(f,p_k) = n(f) \tag{7}$$

$$H_1: H(f,p_k) = A(f,p_k,L) \odot U(f,p_k,L) + n(f) \tag{8}$$

Under the hypothesis of uncorrelated white noise, the log likelihood ratios of the channel matrix under each of the two hypotheses may be expressed via the following relationships:

$$\log Pr(H_r | H_0) \propto -\sum_f |H_r(f)|^2 \tag{9}$$

-continued
$$\log Pr(H_r|H_1) \propto -\sum_f |H_r(f) - A(f, p_k, L) \odot U(f, p_k, L)|^2 \quad (10)$$

$Pr(H_r|H_0)$ denotes the probability that the received channel matrix corresponds to the hypothesis $H_0$.

$Pr(H_r|H_1)$ denotes the probability that the received channel matrix corresponds to the hypothesis $H_1$.

The sign $\propto$ means "proportional to".

The Neyman-Pearson criterion is used, which was developed in order to maximize the probability of detection while ensuring a given probability of a false alarm. This criterion consists in comparing the likelihood ratio of the channel matrices, under each of the hypotheses, with a predetermined threshold $\lambda$. This is an LRT (Likelihood-Ratio Test).

A target is detected when the following relationship holds:

$$\log Pr(H_r|H_0) - \log Pr(H_r|H_1) \leq \lambda \quad (11)$$

The relationship (11) is also written in the form:

$$-\sum_f |H_r(f)|^2 + \sum_f |H_r(f) - A(f, p_k, L) \odot U(f, p_k, L)|^2 \leq \lambda \quad (12)$$

In practice, the matrices A and U are unknown and the log likelihood ratio for the hypothesis $H_1$ cannot be calculated directly.

Thus, it is proposed to use a GLRT (Generalized Likelihood-Ratio Test) consisting in injecting, into the LRT defined by equation (12), estimation of the unknown parameters of the likelihood ratio for the hypothesis $H_1$ in the sense of the maximum likelihood.

The test defined in equation (11) then becomes:

$$\log Pr(H_r|H_0) - \max_{A,U} \log Pr(H_r|H_1) \leq \lambda \quad (13)$$

Figure 3:
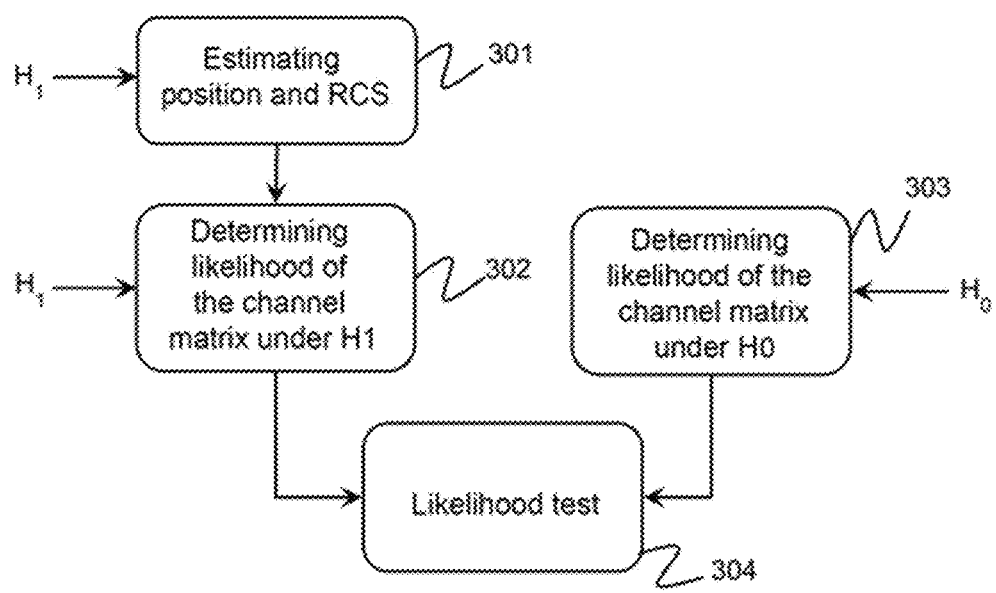
FIG. 3 shows a flowchart describing one embodiment of the target detection step of the method according to the invention.

FIG. 3 details the steps required to perform the detection test 203.

The first step 301 consists in estimating the unknown parameters, that is to say the position of the target and its radar cross section, as well as the loss coefficient L, in the sense of the maximum likelihood.

In the absence of knowledge of the exact position of the target, the observation space or area is discretized in the form of a grid G with a predefined pitch (see FIG. 1). A detection is declared for any cell in the grid confirming the test under the hypothesis $H_1$.

The estimator of the maximum likelihood of the parameters $\gamma$ and p is obtained by searching for the minimum of the following function:

$$\min_{\gamma,p} \sum_f |H_r(f) - A(f, p_k, L) \odot U(f, p_k, L)|^2 \quad (14)$$

Indeed, minimizing the function given by relationship (14) is equivalent to maximizing the log likelihood ratio log $Pr(H_r|H_1)$ (as defined in equation (13)).

By developing relationship (14) on the basis of the model of the matrices A and U (relationships (3) and (4)), the step 301 consists in searching for the minimum of a function $g(\gamma, p_k, L, f)$, the function g being defined on the basis of relationship (14).

$$g(\gamma, p_k, L, f) = \sum_f \left( |\gamma(f)|^2 Tr(M(f, p_k, L) M(f, p_k, L)^H) - \right. \quad (15)$$

-continued
$$\left. \gamma(f)^* Tr(H_r(f) M(f, p_k, L)^H) + \gamma(f) Tr(M(f, p_k, L) H_r(f)^H) \right)$$

$$M(f, p_k, L) = \quad (16)$$
$$G_t(f, p_k) \odot G_r(f, p_k) \odot B_0(f, p_k) \odot B_1(f, p_k, L) \odot U(f, p_k, L)$$

The function g may exhibit several local minima in the space defined by the three parameters ($\gamma$, $p_k$, L).

A first variant of the invention consists in searching for several local minima (for example the N dominant minima, with N a predefined integer) which will each correspond to a potential target.

Another variant of the invention consists in being limited to searching for a single local minimum (the largest), the method described in FIGS. 2 and 3 being applied to search for a single target.

The search for one or more local minima may be performed by an optimization function at the disposal of a person skilled in the art, for example one of the numerical solution functions described in one of references [7], [8] and [9].

Another solution, which is less costly in terms of operations, consists in carrying out this search in several stages.

First, the function g is differentiated with respect to the variable $\gamma(f)$, searching for the value of $\gamma(f)$ which is the solution of the following equation:

$$\frac{\partial g(\gamma, p_k, L, f)}{\partial \gamma(f)} = 0 \quad (17)$$

One solution of equation (17) is given by:

$$\gamma(f) = \sum_f \frac{Tr(H_r(f) M(f, p_k, L)^H)}{Tr(M(f, p_k, L) M(f, p_k, L)^H)} \quad (18)$$

Thus an estimate of the radar cross section may be calculated from relationship (18) by performing a normalized correlation between the channel matrix received and the matrix M defined by equation (16).

The estimate of $\gamma(f)$ is calculated using relationship (18) for a set of hypotheses about the position $p_k$ and loss coefficient L.

For example, the positions $p_k$ vary over all of the positions in the grid G which is superimposed on the area to be analyzed. These positions may be defined in two or in three dimensions.

Likewise, the values of the coefficient L may be chosen from several hypotheses, taking into account the a priori knowledge of the composition of the ground.

Then, for each estimate of $\hat{\gamma}(f)$ calculated, the value of $g(\hat{\gamma}(f))$ is determined.

Then the minimum value of $g(\hat{\gamma}(f))$ among those calculated with the corresponding estimates of $p_k$ and L is retained.

Figure 4:
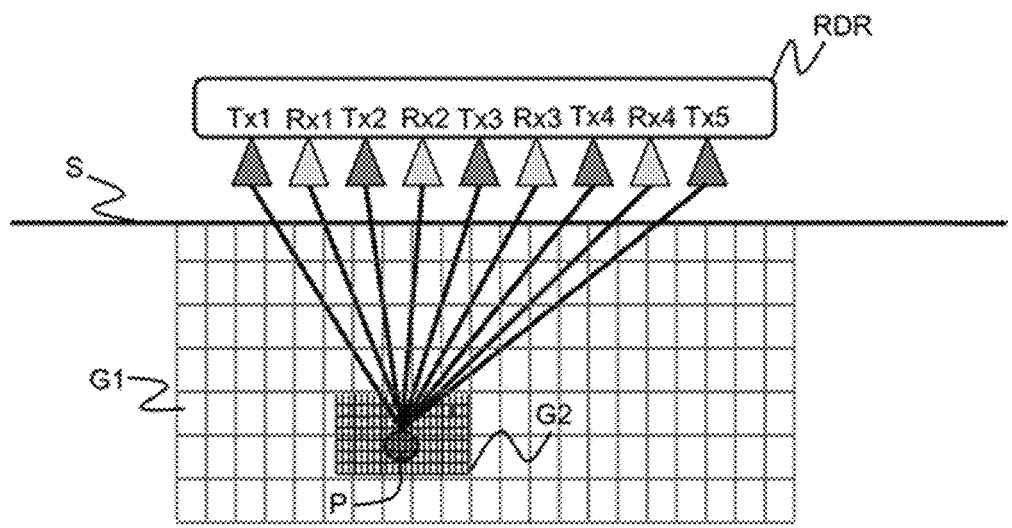
FIG. 4 shows an illustrative diagram of an example of iterative operation of the invention.

The step 301 may be refined by successive iterations by redefining, in each iteration, a new grid G2 with a finer pitch around the estimate of the position $p_k$ obtained in the previous iteration, as shown in FIG. 4.

At the end of the step 301, one (or more) estimates of $g(\hat{\gamma}(f))$ are obtained which are then used to perform a detection test via equation (13).

For this purpose, in a step 302, the likelihood of the received channel matrix is calculated under the hypothesis $H_1$. This calculation is, in fact, directly given by the value of the estimate of $g(\hat{\gamma}(f))$.

In a step 303, the likelihood of the received channel matrix is calculated under the hypothesis $H_0$. This calculation is performed by calculating the term $\Sigma_f |H_r(f)|^2$, which corresponds to the sum or average, over all of the frequencies, of the squared modulus of the channel matrix. It corresponds to the frequency energy of the channel matrix. The norm operator of a complex matrix is defined by the trace of the product of the matrix and the conjugate transposed matrix:

$|H_r(f)|^2 = \text{trace}(H_r(f)H_r(f)^h)$, where $^h$ is the Hermitian operator and trace( ) denotes the trace of a matrix.

Finally, in a step 304, the likelihood test of equation (13) is performed by comparing the difference between the terms calculated in the steps 302 and 303, respectively, with a detection threshold $\lambda$.

As a variant, the propagation speed v of the wave in the media passed through may be estimated by an external method or may indeed be considered as an additional variable of the minimization problem.

Figure 5:
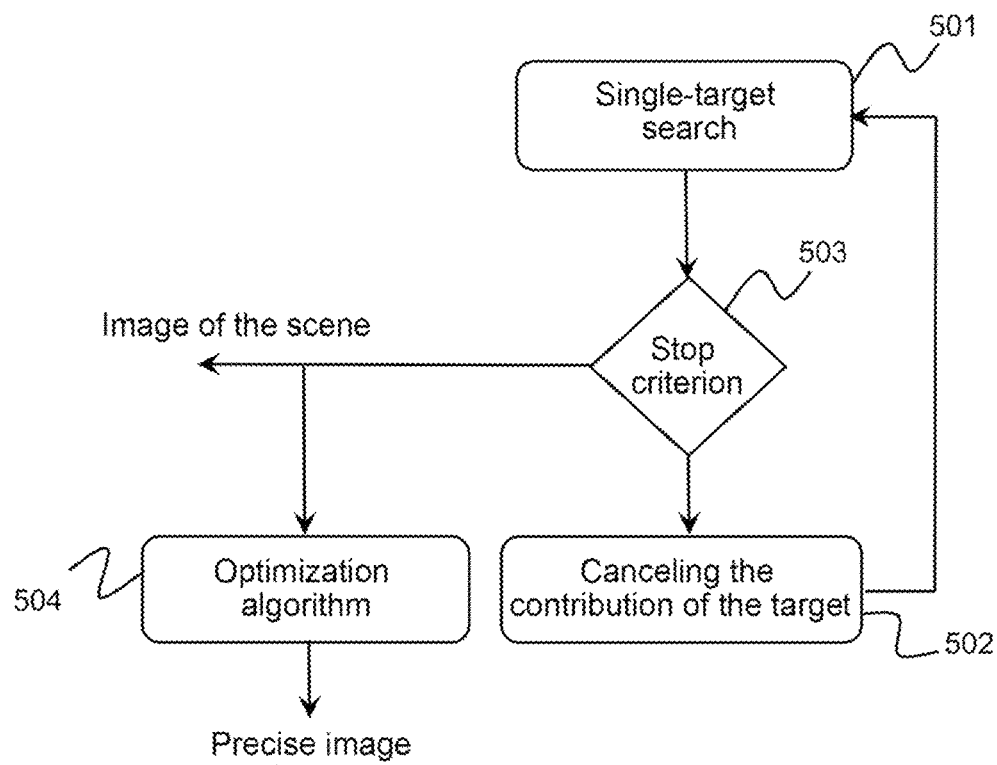
FIG. 5 shows a flowchart describing the steps of one variant embodiment of the method according to the invention.

FIG. 5 schematically illustrates one variant embodiment of the invention adapted to detect multiple targets.

In this variant, the target detection method described in FIGS. 2 and 3 is applied in order to search for a single target (step 501), that is to say the target having the dominant echo.

Then, in a step 502, an echo cancellation algorithm is applied to the received signals (or directly to the channel matrix $H_r(f)$) in order to cancel the contribution of the reflections of the signal on the target which is detected in step 501. One possible algorithm is the algorithm known by the acronym CLEAN, for example described in reference [3].

The iterations are stopped via a stop criterion 503 which may consist of a fixed number of iterations or of a criterion depending on the radar cross section or on the energy of the echoes of the targets detected. The criterion may also be defined on the basis of a difference in energy or in radar cross section between two targets detected in two successive iterations.

In one variant embodiment, the image of the area analyzed is supplied as input to an optimization algorithm 504 in order to improve the precision of the image. The optimization algorithm is, for example, chosen among those described in references [7], [8] or [9]. The algorithm may be based on the stochastic gradient method.

The method described in FIG. 5 based on echo cancellation by successive iterations does, however, exhibit certain drawbacks.

First of all, the cancellation of the contribution of a target is never perfect and therefore introduces parasitic effects. This is particularly true when several echoes are received with very different dynamics, for example because the various targets are far from one another.

Then, the basic hypothesis for detecting a target via a test under two hypotheses, as described previously, is that the noise statistics correspond to Gaussian additive white noise. In the case of several targets, this hypothesis is no longer true, this leading to biases in the detection algorithm.

Figure 6:
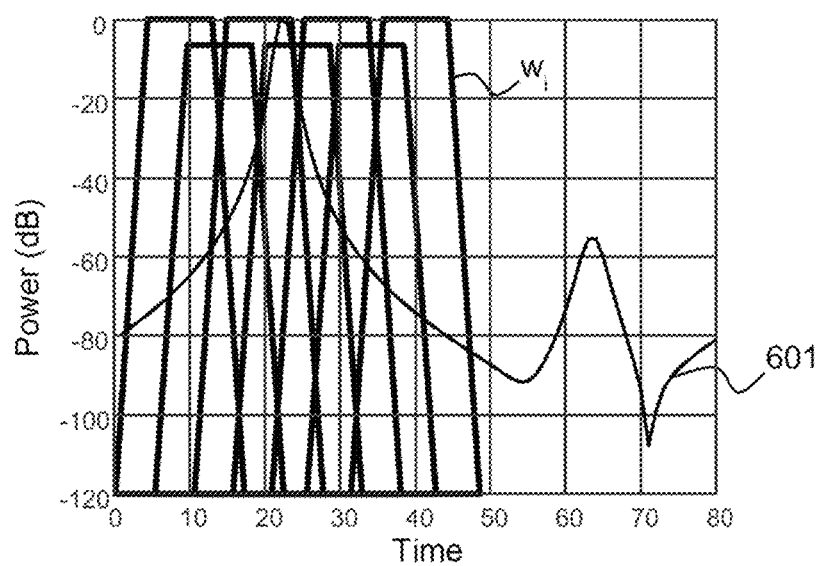
FIG. 6 shows a diagram of a time response of a propagation channel in order to illustrate one variant embodiment of the invention.
Figure 7:
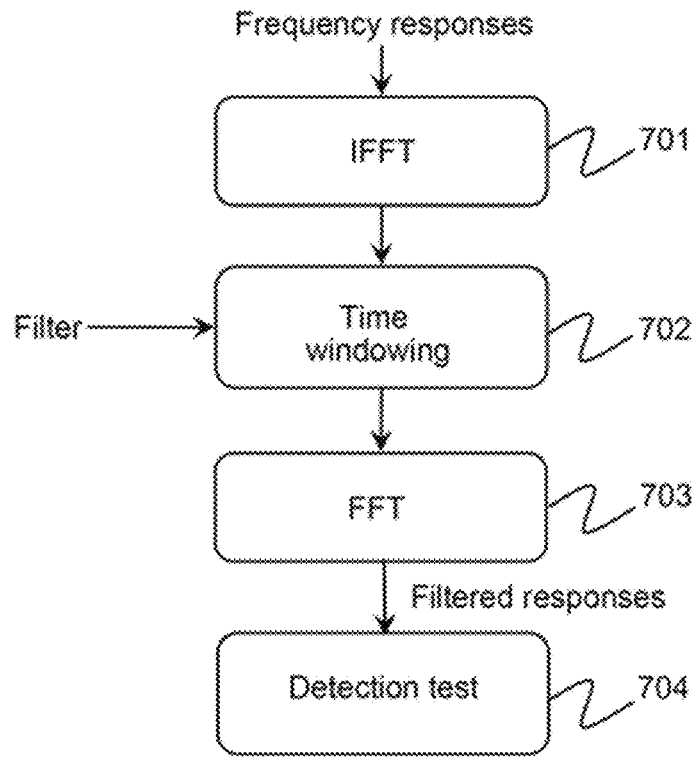
FIG. 7 shows a flowchart describing the steps of another variant embodiment of the method according to the invention.

In order to mitigate these drawbacks, a variant embodiment of the invention, described in FIGS. 6 and 7, is proposed.

This variant consists in applying a filter in the form of time windowing to the channel matrices in order to separately process various sub-areas of the area of the ground to be analyzed and thus to overcome dynamics problems.

The additional steps implemented in this variant are illustrated in FIG. 7. If a vector consisting of the estimate of the propagation channel in terms of frequency for a pair of transmitting and receiving antennas is labeled h, this vector is converted into the time domain via an inverse Fourier transform IFFT (step 701). Next, a filter is applied in the time domain (step 702) to the time response of the channel. The filter w models a time window; it is, for example, of the form w=[0,0,0, . . . 0,1,1,1,0,0,0], the number of consecutive 1s and their position in the filter making it possible to define a slice of the area of the ground to be analyzed in terms of depth (in the main direction of propagation of the wave). Without departing from the scope of the invention, any type of window may be used, for example a Hanning window, or indeed a Blackman-Harris window.

After filtering, the result is converted (step 703) into the frequency domain via a direct Fourier transform, then the new frequency vector obtained is used to constitute the channel matrix $H_r(f)$ as input to the detection method according to one of the variants described previously. The process described in FIG. 7 is applied for each propagation channel linking one of the transmitting antennas to one of the receiving antennas.

The detection method, in its entirety, is iterated for several different time windows, for example by varying the windows over the entire area to be analyzed by cyclically permuting the filter w by p/2 positions in each iteration, where p is equal to the number 1.

FIG. 6 schematically illustrates, in a diagram, an example of a time response 601 of a propagation channel between a transmitting antenna and a receiving antenna. In the same diagram, several time windows have been shown arranged in staggered rows and corresponding to several iterations of the method described above.

Applying time windows makes it possible to be free of dynamics problems and to analyze the ground in successive layers. This method makes it possible to detect targets the echo of which is weak (for example, because of a deep target) in a scene with the presence of strong echoes spaced in terms of depth.

The proposed method makes it possible, in addition to detecting the position of a target, to estimate the propagation losses in the medium of the ground and the radar cross section of the target. This information may serve to characterize the ground or the nature of the target.

Figure 8:
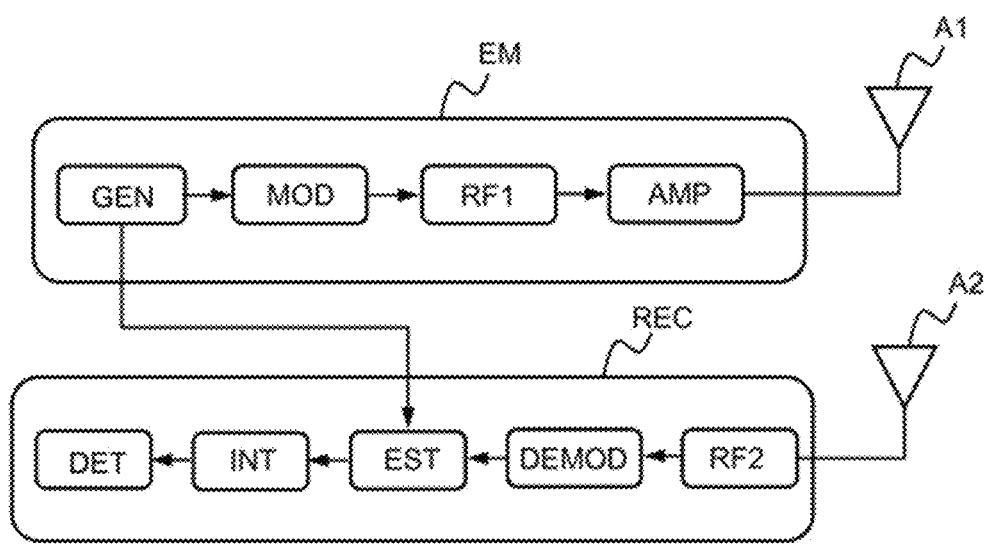
FIG. 8 shows a diagram of an example of a ground-penetrating radar which is able to execute the invention.

FIG. 8 schematically illustrates an example of a ground-penetrating radar configured to implement the invention.

The radar consists of a transmitter EM and of a receiver REC, each provided with at least one antenna A1, A2.

The transmitter EM comprises a generator of a sequence of bits or symbols GEN, an OFDM modulator MOD, a frequency converter RF1 for transposing the signal to a carrier frequency and an amplifier AMP.

The receiver REC comprises a frequency converter RF2 for transposing the received signal into baseband, an OFDM demodulator DEMOD and a processing unit consisting of a channel estimation module EST which determines the channel matrices on the basis of the demodulated signals and of the sequence transmitted by the generator GEN, an integrator INT which carries out an (average) integration and a concatenation of the frequency sub-bands and a target detection module DET which implements the processing steps described previously in order to produce any one of the embodiments of the invention.

Without departing from the scope of the invention, the diagram in FIG. 8 is given for purely illustrative purposes and the radar may comprise other equipment not identified in FIG. 8.

The channel estimation, integration and detection modules EST, INT and DET may be produced in software and/or hardware form, notably using one or more processors and one or more memories. The processor may be a generic processor, a specific processor, an application-specific integrated circuit (ASIC) or a field-programmable gate array (FPGA).

REFERENCES

[1] M. Ambrosanio, M. T. Bevacqua, T. Isernia, and V. Pascazio. The tomographic approach to ground-penetrating radar for underground exploration and monitoring: A more user-friendly and unconventional method for subsurface investigation. IEEE Signal Processing Magazine.

[2] Chin Yuan Chong. Signal processing for MIMO radars: detection under gaussian and non-gaussian environments and application to STAP. In PhD thesis, 2011.

[3] J. A. Hogbom. Aperture Synthesis with a Non-Regular Distribution of Interferometer Baselines. AAPS, 15:417, June 1974.

[4] D. H. N. Marpaung and Yilong Lu. A comparative study of migration algorithms for UWB GPR images in SISO-SAR and MIMO-array configurations. In 2014 15th International Radar Symposium (IRS), pages 1-4, 2014.

[5] Z. Zeng, J. Li, L. Huang, and F. Liu. Improvement of target imaging quality by multi-polarization MIMO GPR. In 2012 14th International Conference on Ground Penetrating Radar (GPR), pages 119-124, 2012.

[6] X. Zhuge and A. G. Yarovoy. Three-dimensional near-field mimo array imaging using range migration techniques. IEEE Transactions on Image Processing, 21(6): 3026-3033, 2012.

[7] Byrd, R. H., J. C. Gilbert, and J. Nocedal. "A Trust Region Method Based on Interior Point Techniques for Nonlinear Programming." *Mathematical Programming*, Vol. 89, No. 1, 2000, pp. 149-185.

[8] Byrd, R. H., Mary E. Hribar, and Jorge Nocedal. "An Interior Point Algorithm for Large-Scale Nonlinear Programming." *SIAM Journal on Optimization*, Vol. 9, No. 4, 1999, pp. 877-900.

[9] Coleman, T. F. and Y. Li. "An Interior, Trust Region Approach for Nonlinear Minimization Subject to Bounds." *SIAM Journal on Optimization*, Vol. 6, 1996, pp. 418-445.

The invention claimed is:

1. A method for detecting at least one target buried in an area of the ground, using a ground-penetrating radar, the radar comprising at least one transmitting antenna and at least one receiving antenna, the method comprising the steps of:
- acquiring, on each receiving antenna, a measurement of a signal transmitted by each transmitting antenna and reflected in the area of the ground,
- determining, on the basis of said measurements, an estimate, in the frequency domain, of the propagation channel for each pair consisting of a transmitting antenna and of a receiving antenna, said estimates being grouped together in a channel matrix having a first dimension which is equal to the number of receiving antennas, a second dimension which is equal to the number of transmitting antennas and a third dimension which is equal to the number of frequencies,
- defining a first hypothesis H0 corresponding to an absence of target in the area of the ground, the channel matrix under this first hypothesis being modeled by noise,
- defining a second hypothesis H1 corresponding to the presence of at least one target in the area of the ground, the channel matrix under this second hypothesis being modeled by a propagation channel model depending at least on the characteristics of the transmitting antennas and of the receiving antennas and on the signal propagation losses in the ground,
- performing a test of the likelihood ratio between the likelihood of the channel matrix under the second hypothesis H1 and the likelihood of the channel matrix under the first hypothesis H0, in order to conclude whether a target is present at a given position in the area of the ground.

2. The detection method as claimed in claim 1, wherein the step of performing a test of the likelihood ratio between the first hypothesis H0 and the second hypothesis H1 comprises the sub-steps of:
- determining at least one estimator of the maximum likelihood of the position and of the radar cross section of a target, under the second hypothesis H1,
- determining the likelihood of the channel matrix under the second hypothesis H1 for each estimator,
- determining the likelihood of the channel matrix under the first hypothesis H0,
- comparing the ratio between the two likelihoods with a predetermined detection threshold in order to deduce therefrom the presence or the absence of a target for each estimated position.

3. The detection method as claimed in claim 2, wherein the step of determining at least one estimator of the maximum likelihood of the position and of the radar cross section of a target, under the second hypothesis H1, is performed by searching for at least one extremum of a function of three variables depending on the position of a target in the area of the ground, on the radar cross section of a target and on a coefficient of signal transmission losses in the area of the ground.

4. The detection method as claimed in claim 3, wherein the search for at least one extremum of said function of three variables is performed by:
- determining an estimator of the maximum likelihood of the radar cross section by calculating a normalized correlation between the channel matrix and a loss matrix including the transfer functions of the transmitting and receiving antennas, the signal propagation losses in free space and in the area of the ground,
- searching for at least one extremum according to the position and the loss coefficient of said function evaluated for the estimated radar cross section.

5. The detection method as claimed in claim 4, wherein the likelihood of the channel matrix under the second hypothesis H1 is determined by an extremum of said function.

6. The detection method as claimed in claim 2, wherein the likelihood of the channel matrix under the first hypothesis H0 is determined at least by calculating the energy of the channel matrix.

7. The detection method as claimed in claim 1, wherein a target position is searched for in a two- or three-dimensional grid (G1, G2) having a defined initial pitch, the method being iterated over several iterations, reducing the area and the initial pitch in each iteration.

8. The detection method as claimed in claim 1, comprising the steps of:
converting the propagation channel estimates for each pair consisting of a transmitting antenna and of a receiving antenna, into the time domain,
applying a filter to the estimates in the form of time windowing,
converting the filtered estimates into the frequency domain,
grouping together the filtered estimates in a channel matrix.

9. The detection method as claimed in claim 8, wherein the time windowing is defined so as to filter the contributions of the signals corresponding to a distance interval between the radar and the area of the ground.

10. The detection method as claimed in claim 9, the method being repeated for several different filters so as to cover the entire area of the ground.

11. The detection method as claimed in claim 1, further comprising a step of canceling the contribution of a target detected in the measurements of acquired signals, for example by means of an echo cancellation algorithm, the method being iterated over several successive iterations, canceling in each new iteration the echo of the target detected in the previous iteration.

12. A ground-penetrating radar comprising at least one transmitting antenna and at least one receiving antenna and a device for detecting at least one target buried in an area of the ground configured to execute the steps of the detection method as claimed in claim 1.

13. A non-transitory tangible computer-accessible storage medium having stored thereon a computer program for executing the method as claimed in claim 1, when the computer program is executed by a computer.

14. A non-transitory processor-readable storage medium, on which is stored instructions for executing the method as claimed in claim 1, when the instructions are executed by a processor.

* * * * *